(12) United States Patent
Mater, Jr. et al.

(10) Patent No.: US 7,712,761 B2
(45) Date of Patent: *May 11, 2010

(54) EXTENSION COUPLING FOR INTERCONNECTING TRAILER AND TOW HITCH

(75) Inventors: Robert F. Mater, Jr., Elkhart, IN (US); Gomer B. Jones, Elkhart, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 330 days.

This patent is subject to a terminal disclaimer.

(21) Appl. No.: 11/762,268

(22) Filed: Jun. 13, 2007

(65) Prior Publication Data

US 2008/0029996 A1 Feb. 7, 2008

Related U.S. Application Data

(63) Continuation-in-part of application No. 11/451,670, filed on Jun. 13, 2006, now Pat. No. 7,530,591.

(51) Int. Cl.
*A01B 59/041* (2006.01)
(52) U.S. Cl. ............. 280/474; 280/416.1; 280/417.1; 280/441; 280/507
(58) Field of Classification Search ............ 280/474, 280/441, 507, 417.1, 416.1
See application file for complete search history.

(56) References Cited

U.S. PATENT DOCUMENTS

| | | | |
|---|---|---|---|
| 2,351,151 A | 6/1944 | Sattler | |
| 3,695,213 A | 10/1972 | Littlefield | |
| 3,792,432 A | 2/1974 | Ellis et al. | |
| 3,897,086 A | 7/1975 | Breford | |
| 4,131,296 A | 12/1978 | Strader | |
| 5,328,198 A | 7/1994 | Adams | |
| 5,403,031 A | 4/1995 | Gottschalk et al. | |
| 5,785,341 A * | 7/1998 | Fenton | ........................ 280/441 |
| 5,890,728 A * | 4/1999 | Zilm | ........................ 280/433 |
| 6,170,849 B1 | 1/2001 | McCall | |
| 6,170,850 B1 | 1/2001 | Works | |
| 6,375,211 B1 | 4/2002 | Mackarvich | |
| 6,581,951 B2 | 6/2003 | Lange | |
| 6,726,396 B2 | 4/2004 | Plett | |
| 6,746,037 B1 | 6/2004 | Kaplenski et al. | |
| 6,854,757 B2 | 2/2005 | Rehme | |
| 6,877,757 B2 | 4/2005 | Hayworth | |
| 6,913,276 B1 | 7/2005 | Bauder | |
| 6,957,823 B1 | 10/2005 | Allen | |

(Continued)

OTHER PUBLICATIONS

International Patent Application No. PCT/US2008/066569 International Search Report and Written Opinion mailed Aug. 29, 2008.

*Primary Examiner*—Lesley Morris
*Assistant Examiner*—Tashiana Adams
(74) *Attorney, Agent, or Firm*—Woodard, Emhardt, Moriarty, McNett & Henry LLP (57) ABSTRACT

An extension coupling for interconnecting a trailer to a tow hitch carried on a tow vehicle includes a pin box assembly having a first end and a second end. The first end is pivotally connected to the trailer. A king pin is connected to the second end. The pin box assembly includes a locking wedge that engages the tow hitch to strictly limit pivoting movement of the pin box assembly relative to the tow hitch.

27 Claims, 11 Drawing Sheets

U.S. PATENT DOCUMENTS

| | | |
|---|---|---|
| 6,971,660 B1 | 12/2005 | Putnam |
| 6,986,624 B1 | 1/2006 | Tabler |
| 7,000,937 B2 * | 2/2006 | Dick .................. 280/416.1 |
| 7,121,574 B2 | 10/2006 | Bouwkamp |
| 7,164,081 B1 | 1/2007 | Tollefson |
| 7,222,872 B1 | 5/2007 | Bauder |
| 2006/0043694 A1 | 3/2006 | Kaun |

* cited by examiner

EXTENSION COUPLING FOR INTERCONNECTING TRAILER AND TOW HITCH

This application is a continuation-in-part of U.S. patent application Ser. No. 11/451,670 filed on 13 Jun. 2006.

TECHNICAL FIELD

The present invention relates generally to the towing equipment field and, more particularly, to a new and improved extension coupling.

BACKGROUND OF THE INVENTION

The present invention relates to a new extension coupling for interconnecting a trailer to a tow hitch carried on a tow vehicle. The extension coupling provides both softening in the vertical direction and anti-chucking in the longitudinal or horizontal direction so as to provide enhanced performance and a smoother ride. In effect the extension coupling acts as a buffer between the tow vehicle and the trailer, significantly reducing the negative impact of vertical shock and longitudinal chucking to provide an improved ride. The coupling relieves stress on the towing vehicle, trailer frame, cabinets, mechanicals and support mechanisms. The smoother ride also reduces fatigue for drivers and passengers in the towing vehicle.

SUMMARY OF THE INVENTION

In accordance with the purposes of the present invention as described herein, an extension coupling is provided for interconnecting a trailer to a tow hitch carried by a tow vehicle. The extension coupling comprises a pin box assembly including a first section, a second section and a pivot connecting the first and second sections together, a shock absorber connected between the first and second sections, an air spring connected between the first and second section, a king pin carried on the second section and a locking wedge carried on the second section.

Further describing the invention, the extension coupling includes a pivot shaft carried on the first section. In addition, the extension coupling includes a trailer mount wherein the trailer mount is fixed to the trailer and the pin box assembly is connected to the trailer mount by the pivot shaft. In one possible embodiment, the trailer mount includes a mounting plate having a reinforcing rib and at least two projecting flanges. In this embodiment the mounting plate includes a hub that receives the pivot shaft and the reinforcing rib is arc shaped and extends concentrically around the hub. In another possible embodiment, the trailer mount includes a v-shaped base and a hub for receiving the pivot shaft. At least two mounting flanges may be provided projecting from that base.

Still further describing the invention the shock absorber is provided between the air spring and the mount. The air spring is provided between the shock absorber and the pivot. The pivot is provided at a front end of the pin box assembly. Still further, the air spring and the shock absorber are provided between the pivot shaft and the king pin. In addition, the shock absorber and the air spring are both offset from the king pin and the pivot shaft. Further, the air spring may comprise a rubber air bladder.

More specifically describing the pin box assembly, the second section thereof includes a skid plate. Two fasteners are provided for securing the locking wedge to the skid plate. Specifically, the locking wedge includes two elongated slots and the two fasteners are received in the two elongated slots. In addition, the king pin is received in and projects through the skid plate adjacent the locking wedge.

In the following description there is shown and described several possible embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain certain principles of the invention. In the drawings.

Reference will now be made in detail to the present preferred embodiments of the invention, examples of which are illustrated in the accompanying drawing figures.

DETAILED DESCRIPTION OF THE INVENTION

Reference is now made to FIGS. 1-7 illustrating the extension coupling 10 of the present invention. The extension coupling 10 includes an elongated arm in the form of a pin box assembly 12 including an extension arm assembly 14. The extension arm assembly 14 is connected to a trailer mount 16. As best illustrated in FIG. 3a, the pin box assembly 12 includes a first section 18 having a top wall 20 and two downwardly depending sidewalls 22. A cross member 24 extends between the sidewalls 22 and provides additional strength and rigidity to the structure. A shock absorber mounting bracket 26 also extends between the sidewalls 22. The mounting bracket 26 includes a pair of ears 28 that cooperate to form a trunnion mounting for one end of a shock absorber 30 in a manner that will be described in greater detail below (see also FIGS. 4 and 5). The top wall 20, sidewalls 22, cross member 24, mounting bracket 26 and ears 28 may all be constructed from steel for high strength and may all be connected together by welding if desired. The sidewalls 22 may also include rounded edges or return flanges 23 in order to provide added strength while minimizing weight.

Figure 3A:
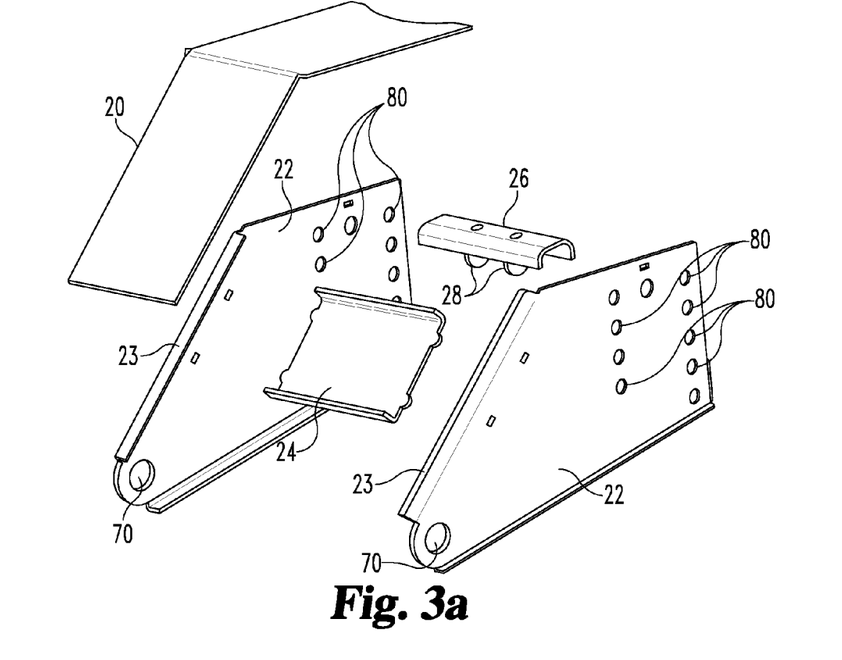
FIGS. 3a and 3b are detailed exploded perspective views, respectively, of the first and second sections of the pin box assembly.
Figure 3B:
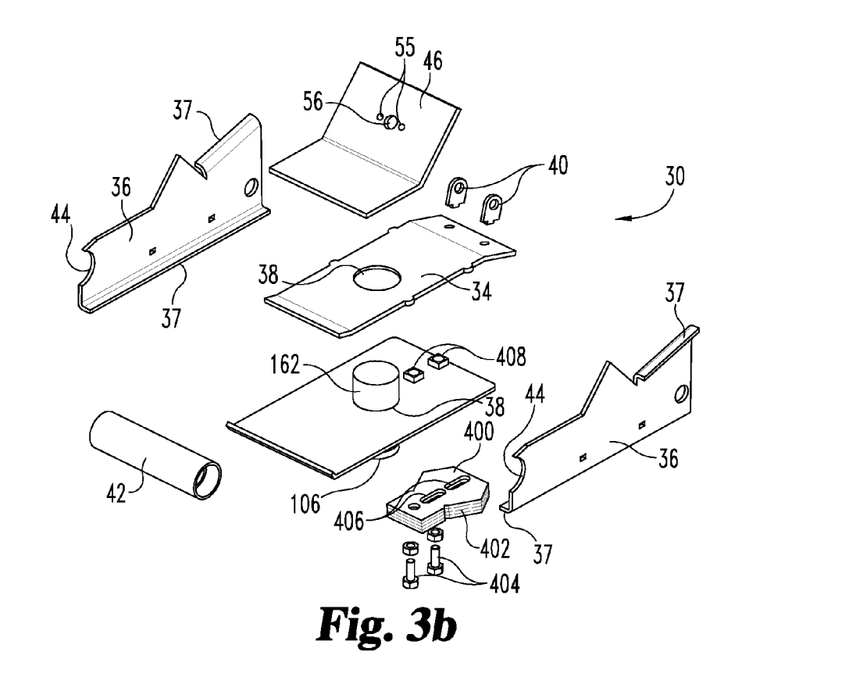

The pin box assembly 10 also includes a second section 30 incorporating a skid plate 32, an upper king pin support plate 34 and two upwardly depending side skirts 36 (see FIG. 3b). A king pin 106 includes a base 162 that is received and welded into cooperating, aligned apertures 38 provided in the skid plate 32 and the upper king pin support plate 34. This two point mounting of the king pin 106 enhances the load transfer characteristics of the assembly 10. A pair of ears 40 are welded adjacent a rear end of the upper support plate 34 and function as a trunnion to receive one end of the shock absorber 30 (see also FIGS. 4 and 5). A pivot tube 42 is received and welded in cooperating slots 44 provided in the front end of the side skirts 36. Like the sidewalls 22, the side skirts 36 include return flanges 37 for added strength. An air spring mounting plate 46 is secured to the sidewalls 36. The skid plate 32, upper king pin support plate 34, side skirts 36, king pin 106, ears 40, pivot tube 42 and air spring mounting plate 46 may all be constructed from high strength steel and, for example, may all be secured together by welding if desired.

A locking wedge 400 is carried on the second section 30 of the pin box assembly 12. More specifically, the locking wedge 400 is secured to the skid plate 32 by means of fasteners in the form of two bolts 404. Fasteners 404 extend through two elongated slots 406 in the locking wedge 400 and threadedly engage nuts 408 welded to the skid plate 32. When the fasteners 404 are tightened down, the locking wedge 400 is fixed to the skid plate 32. When the fasteners 404 are loosened, the locking wedge 400 will slide toward and away from the king pin 106 by means of the slots 406. This allows the positioning of the locking wedge 400 on the skid plate 32 to be adjusted to fit properly in the throat N of any trailer hitch H when the king pin 106 is held in the jaw of the hitch H (see FIGS. 8 and 9 and the discussion below).

Figure 4:
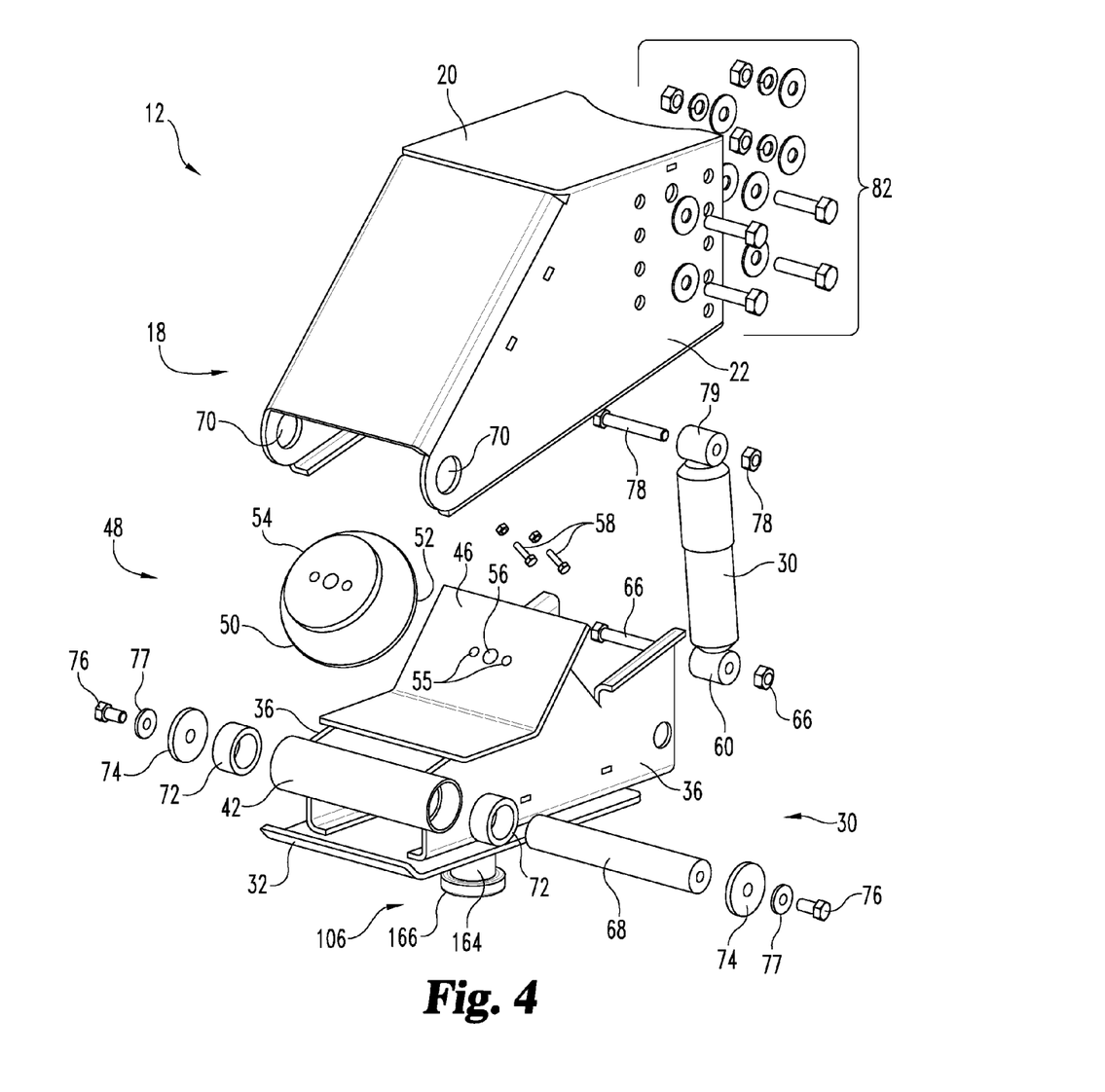
FIG. 4 is an exploded perspective view of the pin box assembly section of the embodiment illustrated in FIG. 1.
Figure 5:
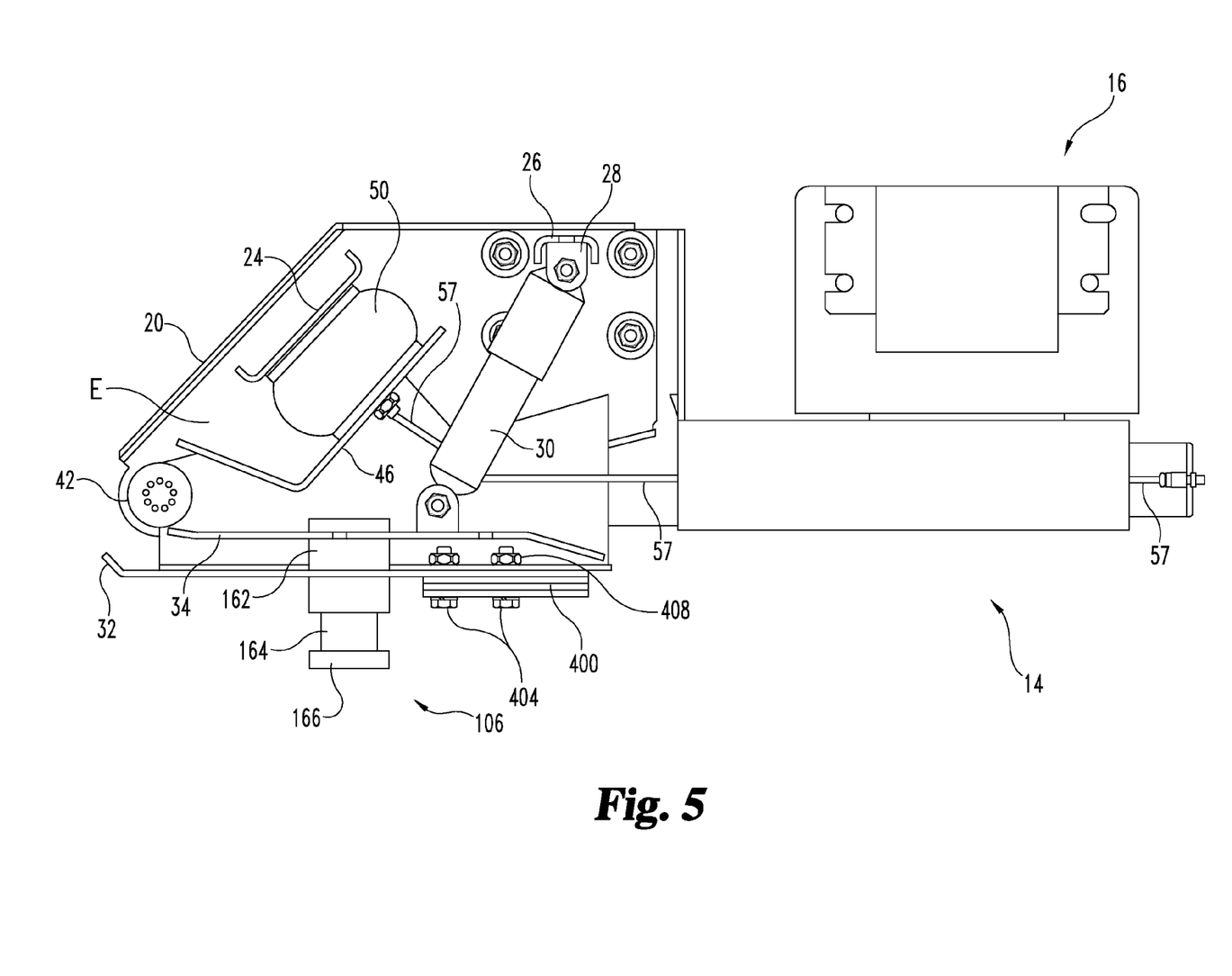
FIG. 5 is a side elevational view of the extension coupling illustrated in FIGS. 1 and 2 with the near side wall and side skirt removed to show the enclosure and connection of the shock absorber and air spring.

An air spring, generally designated by reference numeral 48, includes an air bladder 50, a bottom or base plate 52 and a top plate 54 (see FIGS. 4 and 5). The mounting plate 46 includes two aligned apertures 55 and a slot 56 there between. The base plate 52 of the air spring 48 is secured to the mounting plate 46 by fasteners such as a pair of cooperating bolts and nuts 58 secured in the apertures 55. The air bladder 50 of the air spring 48 is connected by a line 57 that passes through the slot 56 and connects through a valve (not shown) with an air source (not shown). The lower end 60 of the shock absorber 30 is connected to the ears 40 by means of the cooperating nut and bolt 66.

The first section 18 and second section 30 are pivotally connected together at the front end thereof by means of a pivot shaft 68 that passes through the aperture 70 in one of the side walls 22, the pivot tube 42 of the second section 30 and the aperture 70 of the other sidewall 22. Bushings 72 provided between the pivot shaft 68 and the pivot tube 42 insure free pivoting action between the two sections 18, 30. Outer retainer washers 74 and cooperating bolts 76 and lockwashers 77 complete the pivotal connection. A cooperating nut and bolt 78 completes the connection of the upper end 79 of the shock absorber 30 to the ears 28 on the first section 18. Aligned apertures 80 in the sidewalls 22 function as the attachment points for securing the pin box assembly 12 to the extension arm assembly 14 by using cooperating bolts, nuts and washers 82 in a manner that will be described in greater detail below.

As should be appreciated from reviewing the drawing figures and particularly FIG. 5, the margins of the sidewalls 22 and side skirts 36 overlap so that the sidewalls 22, side skirts 36, top wall 20 and skid plate 28 define an enclosure E. In the illustrated embodiment, the shock absorber 30 is provided at the opening of the enclosure E. The air spring 48 is provided in the enclosure E between the shock absorber 30 and the forward pivot tube 42. In this position, deep in the enclosure E, the air spring 48 is well protected from UV exposure, malicious tampering and road hazards thereby substantially increasing its service life. The rear-mounted shock absorber 30 is also shielded from road hazards and together the first and second sections 18, 30 provide a clean, aesthetically pleasing streamlined design.

As further illustrated in FIG. 5, the king pin 106 has a body including a base 162, a neck 164 and a head 166. The base 162 allows for the mounting of the king pin 106 in the plates 32, 34. The neck 164 is engaged by the jaw assembly of a tow hitch when the extension coupling 10 is properly connected for trailer towing as will be described in detail below.

Figure 6:
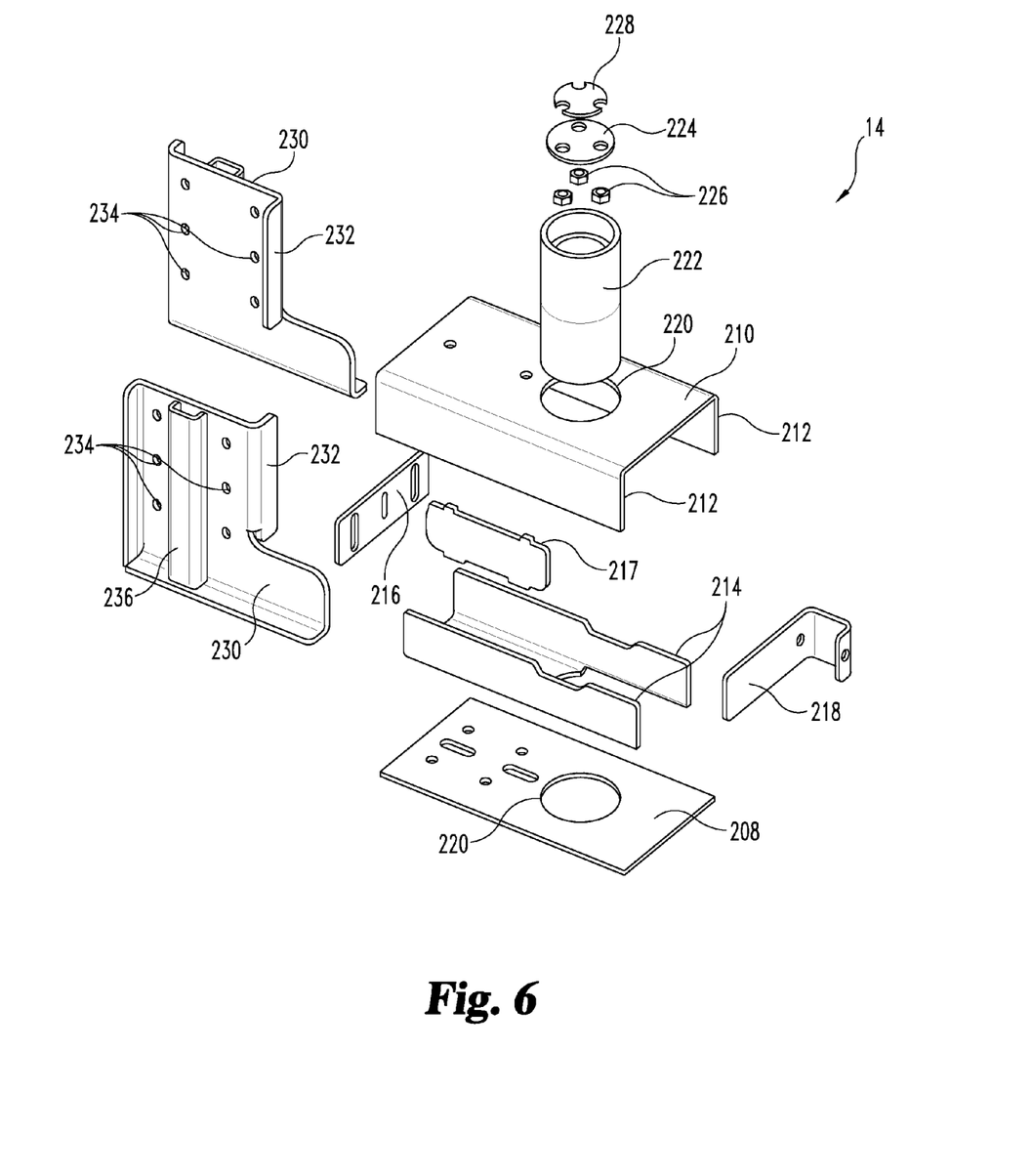
FIG. 6 is an exploded perspective view of the extension arm of the first section of the extension coupling of FIG. 1.
Figure 7:
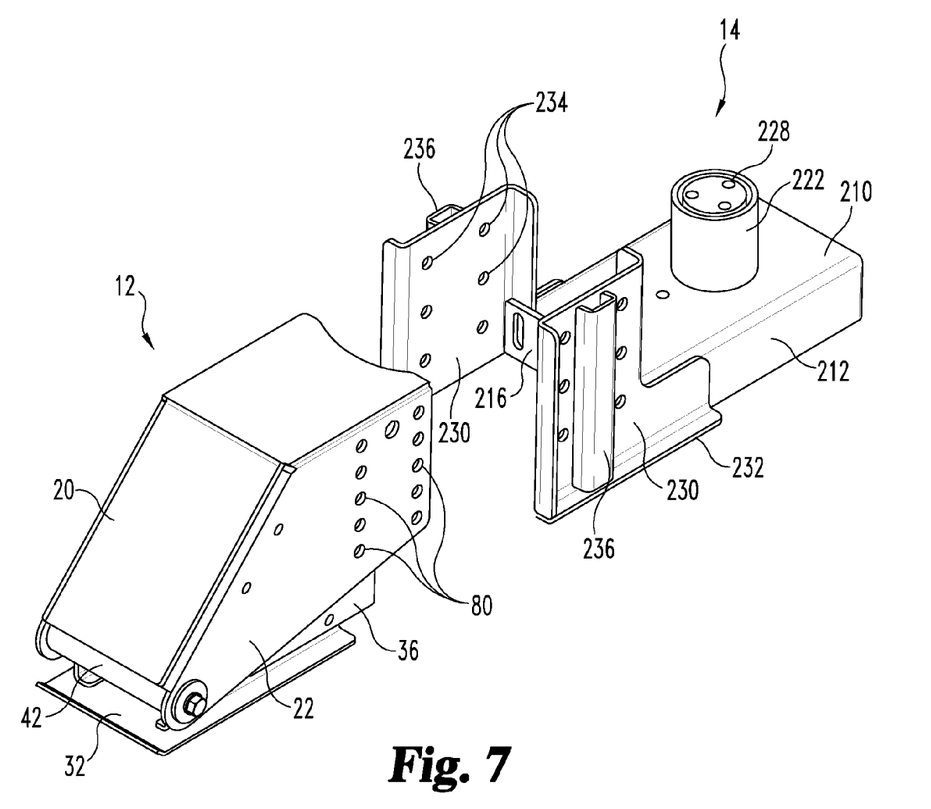
FIG. 7 is a partially exploded perspective view illustrating the first and second sections of the pin box assembly and the extension arm of the first section.

As best illustrated in FIG. 6, the extension arm assembly 14 is of box beam construction and includes a bottom wall 208, a top wall 210 with two downwardly depending sidewalls 212, two interior reinforcing beams 214, a front wall 216 with a reinforcing strut 217 and a rear wall 218. The bottom wall 208 and top wall 210 both include an aperture 220 for receiving and holding a pivot shaft 222. More specifically, the pivot shaft 222 is positioned in the aligned apertures 220 and welded in position A mounting plate 224 including three mounting nuts 226 is welded into the top of the pivot shaft 222. The plate 228 is provided to reinforce the mounting plate 224.

A pair of L-shaped mounting brackets 230 are welded to the opposed sidewalls 212. The brackets 230 include reverse flanges 232 and reinforcing struts 236 for added strength. Each of the brackets 230 includes apertures 234 for receiving the cooperating bolts, nuts and washers 82 used to secure the first section 18 of the pin box assembly 12 to the extension arm assembly 14 (see FIG. 7).

Figure 1:
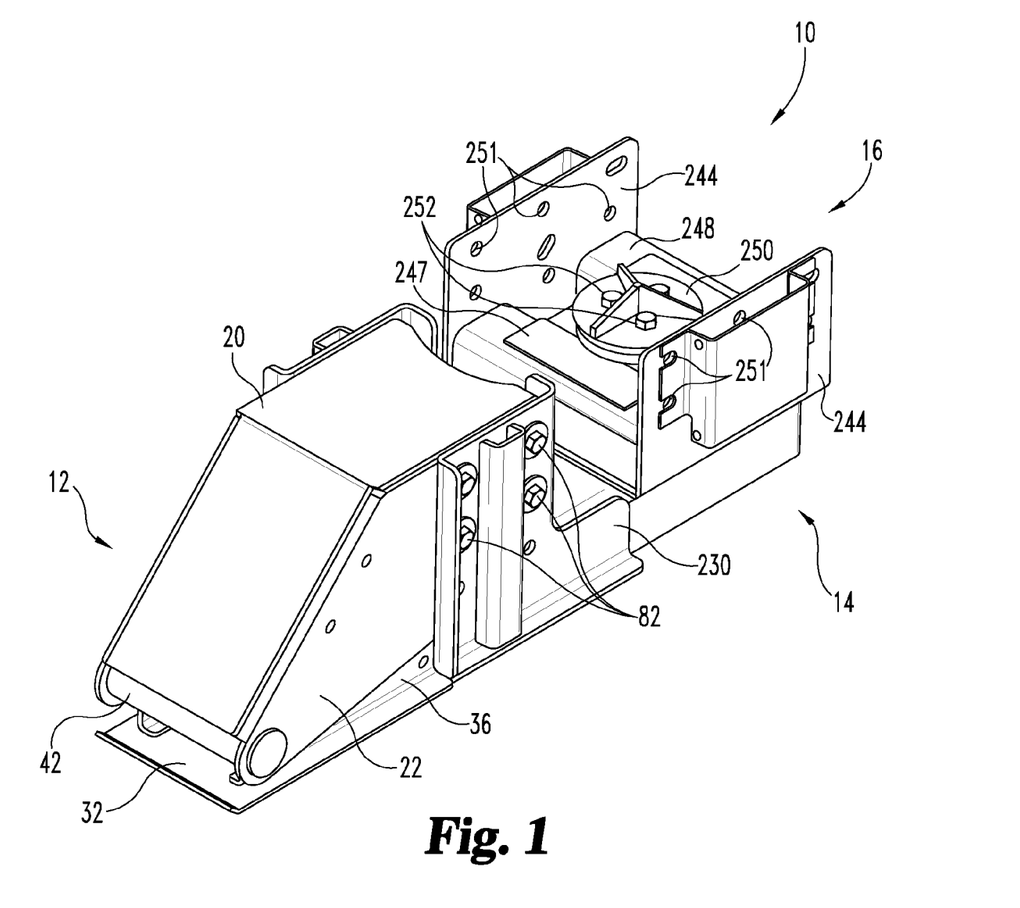
FIG. 1 is a perspective view illustrating a first embodiment of the extension coupling of the present invention.
Figure 2:
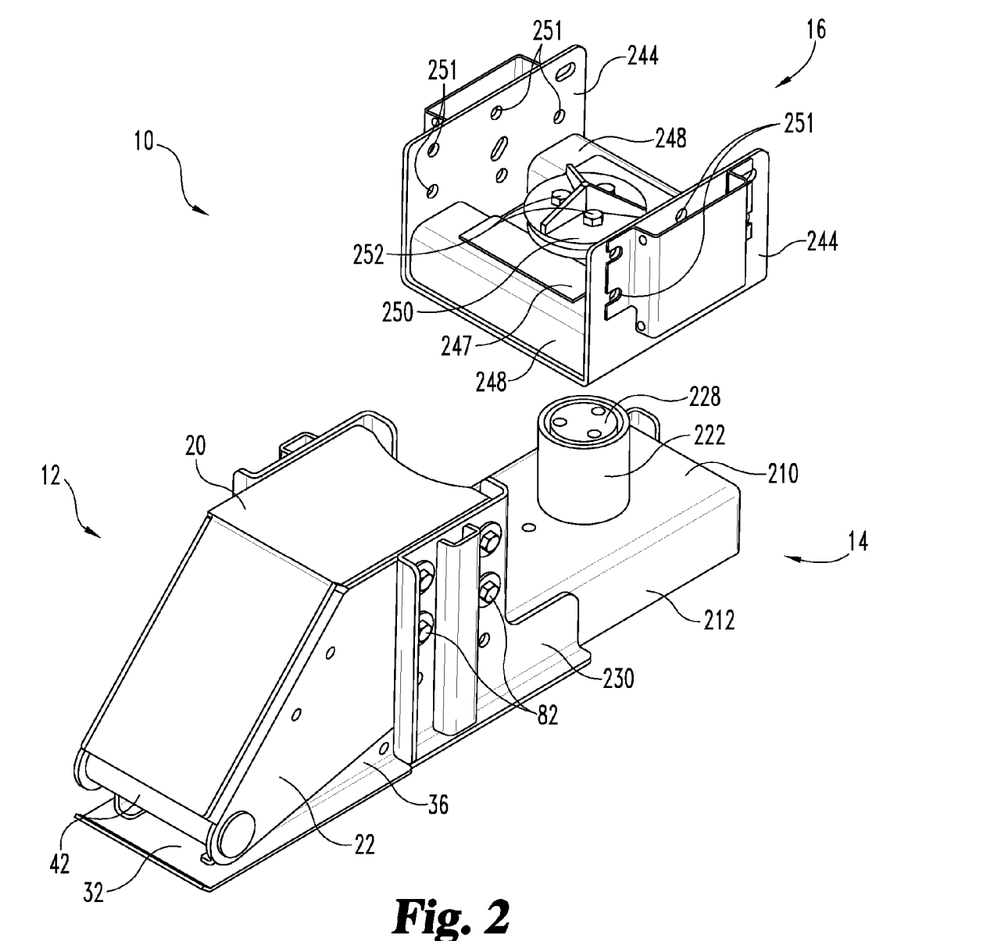
FIG. 2 is a perspective view similar to FIG. 1 but partially exploded to clearly illustrate the trailer mount and the pivot shaft received in the trailer mount.

As best illustrated in FIGS. 1, 2 and 5, the embodiment 10 further includes the trailer mount 16. The trailer mount 16 includes a base 240 having a bottom wall 242 and two upwardly projecting mounting flanges 244. A hub 246 is mounted on the bottom wall 242 over a central aperture (not shown) in the bottom wall. Reinforcing struts 248 extend between the flanges 244 on opposing sides of the hub 246 along the bottom wall 242. A top plate 247 extends between the struts 248 and includes an aperture 249 for receiving the hub 246. All the components 240, 242, 244, 246, 247 and 248 may be made of high strength steel and welded together. Apertures 251 in the mounting flanges 244 provide connection points for securing the trailer mount 16 to a trailer by means of cooperating bolts and lock nuts or other appropriate fasteners (not shown).

The first end of the extension arm assembly 14 is mounted to the trailer through the trailer mount 16. More specifically, the pivot shaft 222 of the extension arm assembly 14 is received in the hub 246 of the trailer mount 16. A low friction bearing such as an annular disc of nylon or polytetrafluoroethylene (not shown) is provided around the pivot shaft 222 between the top wall 210 and the bottom wall 242 of the trailer mount 16. Grease between the pivot shaft 222 and the hub 246 aids in providing free rotary movement of the extension arm and pin box assemblies 14, 12 relative to the trailer mount 16.

The extension arm assembly 14 and trailer mount 16 are secured together by means of a mounting plate or cap 250 and cooperating fasteners 252 that extend through apertures in the cap and engage in the nuts 226 welded to the mounting plates 224, 288 carried at the top of the pivot shaft 222. The mounting cap 250 has a larger diameter than the hub 246 in order to complete a secure connection. A low friction bearing (not shown) such as a nylon or polytetrafluoroethylene disc is provided between the cap 250 and the hub 246 to provide freedom of rotational movement.

Figure 8:
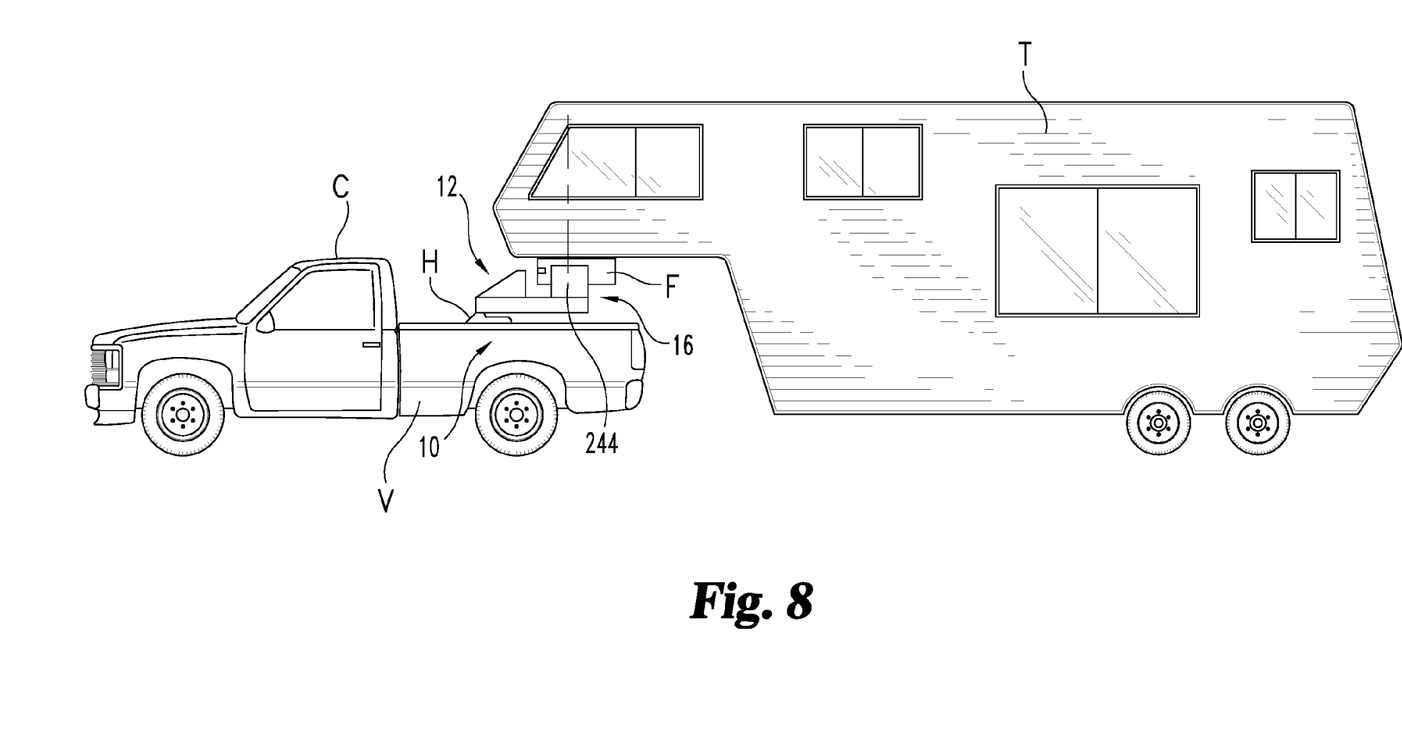
FIG. 8 is a side elevational view illustrating the extension coupling connecting a trailer to a tow hitch carried on the vehicle.
Figure 9:
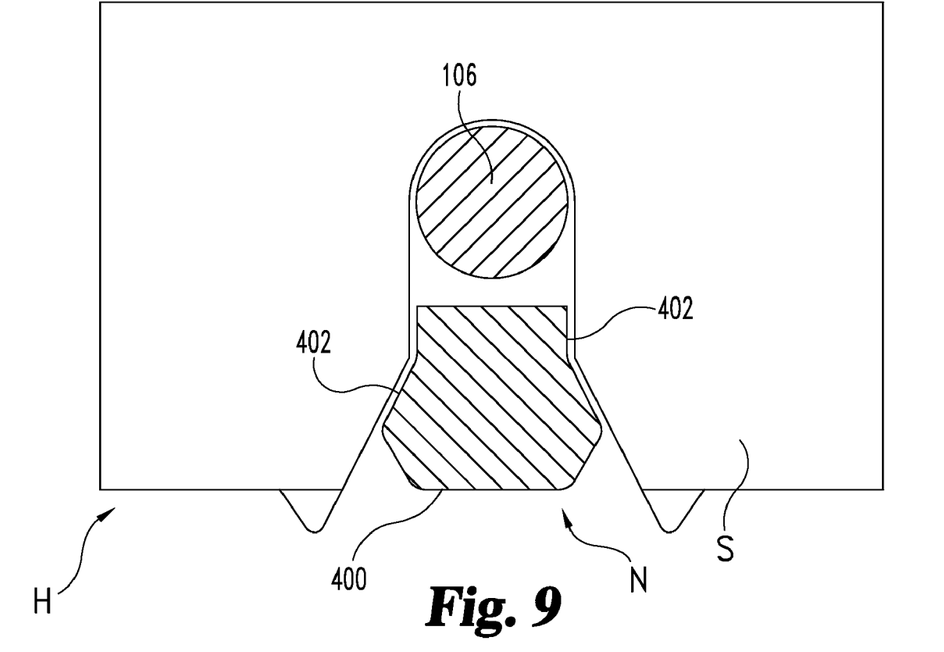
FIG. 9 is a partially sectional and schematical top plan view illustrating how the locking wedge provided on the skid plate of the pin box assembly engages in the throat of a tow hitch to prevent rotation about the king pin.

The extension coupling 10 is secured between a trailer and a towing vehicle as illustrated in FIGS. 8 and 9. More specifically, the trailer mount 16 is secured to the frame F of the trailer T by means of the mounting flanges 244. The pin box assembly 12 pivots freely relative to the trailer mount 16 and the trailer T on the pivot shaft 222 received in the hub 246 of the trailer mount. The king pin 106 is then positioned in the jaw assembly of a fifth wheel trailer hitch H mounted to the bed of the towing vehicle V behind the cab C. The jaw assembly of the fifth wheel trailer hitch H is then closed and locked in a manner known in the art to engage and hold the king pin 106.

As illustrated in FIG. 9, the locking wedge 400 on the skid plate 32 is received within and aligned with the throat N of the skid plate S on the hitch H. If necessary, the fasteners 404 may be loosened to laterally shift the locking wedge 400 relative to the pin box assembly 12 to allow (1) the king pin 106 to be locked in the jaw assembly and (2) the locking wedge to be properly positioned in the throat N to perform its pivot defeat function. The fasteners 404 may then be tightened down again to secure the locking wedge 400 in position in the throat N.

When properly positioned in the throat N, the sidewalls 402 of the locking wedge 400 substantially fill the throat N leading to the jaw of the tow hitch H. Engagement of the sidewalls 402 with the skid plate S function to limit or substantially eliminate any pivoting motion between the pin box assembly 12 and the tow hitch H about the king pin 106. Accordingly, while the trailer T is connected to the tow hitch H at the first end of the extension coupling 10, pivotal movement between the trailer T and towing vehicle V occurs only at the second end of the extension coupling underneath the trailer T at the pivot shaft 222.

The expandable and compressible air spring 48 regulates the compression and expansion rates of the pin box assembly 12. Where an air source, such as an air compressor, is contained within the trailer, the driver may adjust the air pressure in the air spring 48 and accordingly, the compression and expansion rates in order to provide more ideal ride characteristics. More specifically, this allows the operator to tune the performance of the pin box assembly 12 so as to avoid operating at the natural harmonic/Hz frequency of the tow vehicle. A valve is used to control the airflow from the source to the bladder 50 of the air spring 48 or from the air spring to the environment to release pressure. When inflated for use, the top plate 52 engages the bearing surface of the cross member 24.

The shock absorber 30 functions to provide conventional dampening during the towing of the trailer. By placing the pivot shaft or pivot point 42 forward of the king pin 106 center line, the pivot now works in better harmony with the fifth wheel hitch H to which the pin box assembly 12 and trailer are connected thereby significantly reducing longitudinal chucking during trailer towing. More specifically, the pin box assembly 12 successfully combines the best performance characteristics of the leading air-ride and anti-chucking couplers to provide better softening in the vertical direction and anti-chucking in the longitudinal direction so as to provide better overall performance than devices of the prior art.

The foregoing description of a preferred embodiment of the present invention has been presented for purposes of illustration and description. It is not intended to be exhaustive or to limit the invention to the precise form disclosed. Obvious modifications or variations are possible in light of the above teachings. For example, for some applications the air spring is aft of the shock absorber: that is, the positions of the air spring and shock absorber are reversed. Further, the invention may be structurally modified.

Figure 10:
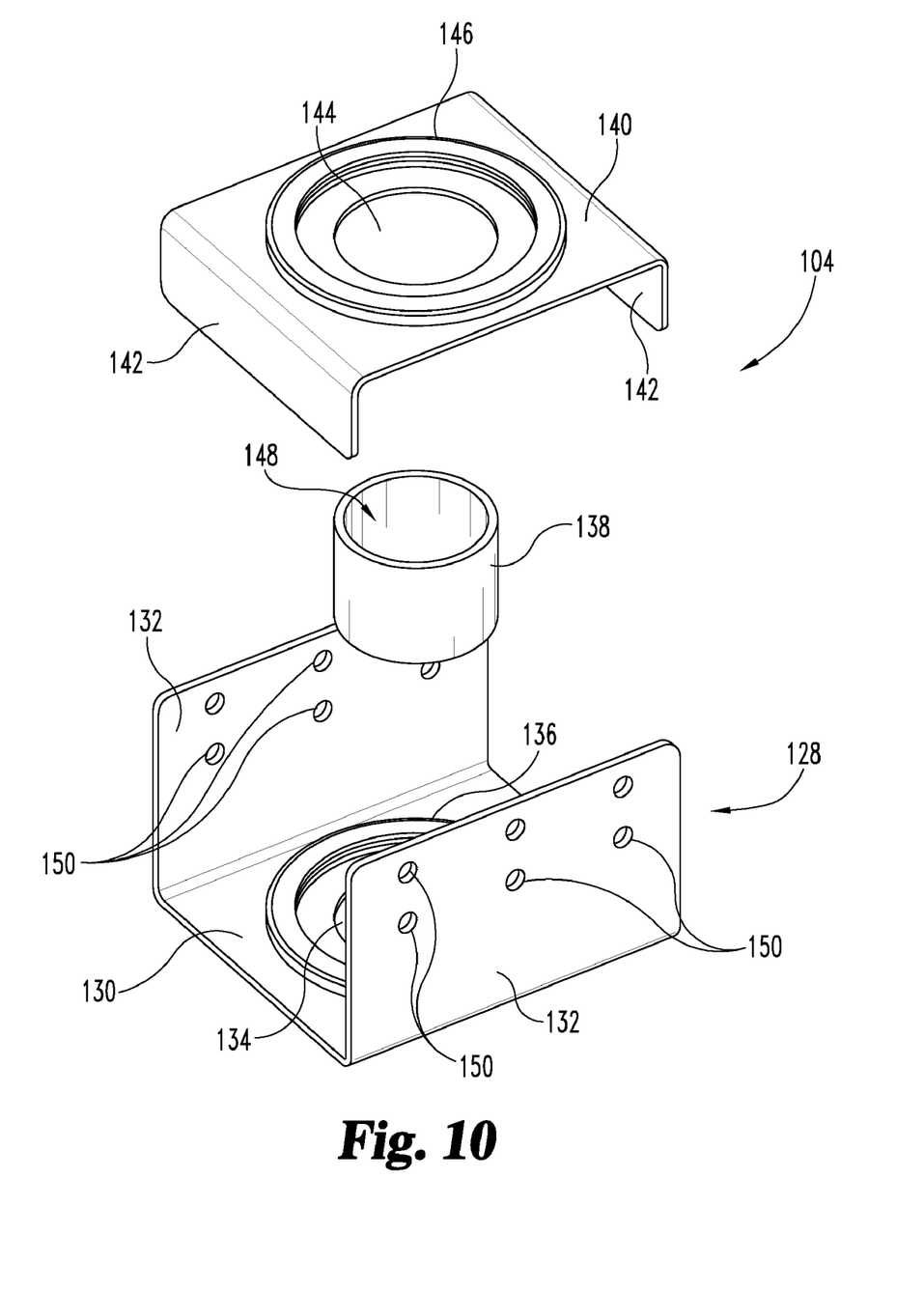
FIG. 10 is a perspective view of an alternative embodiment of the trailer mount.
Figure 11:
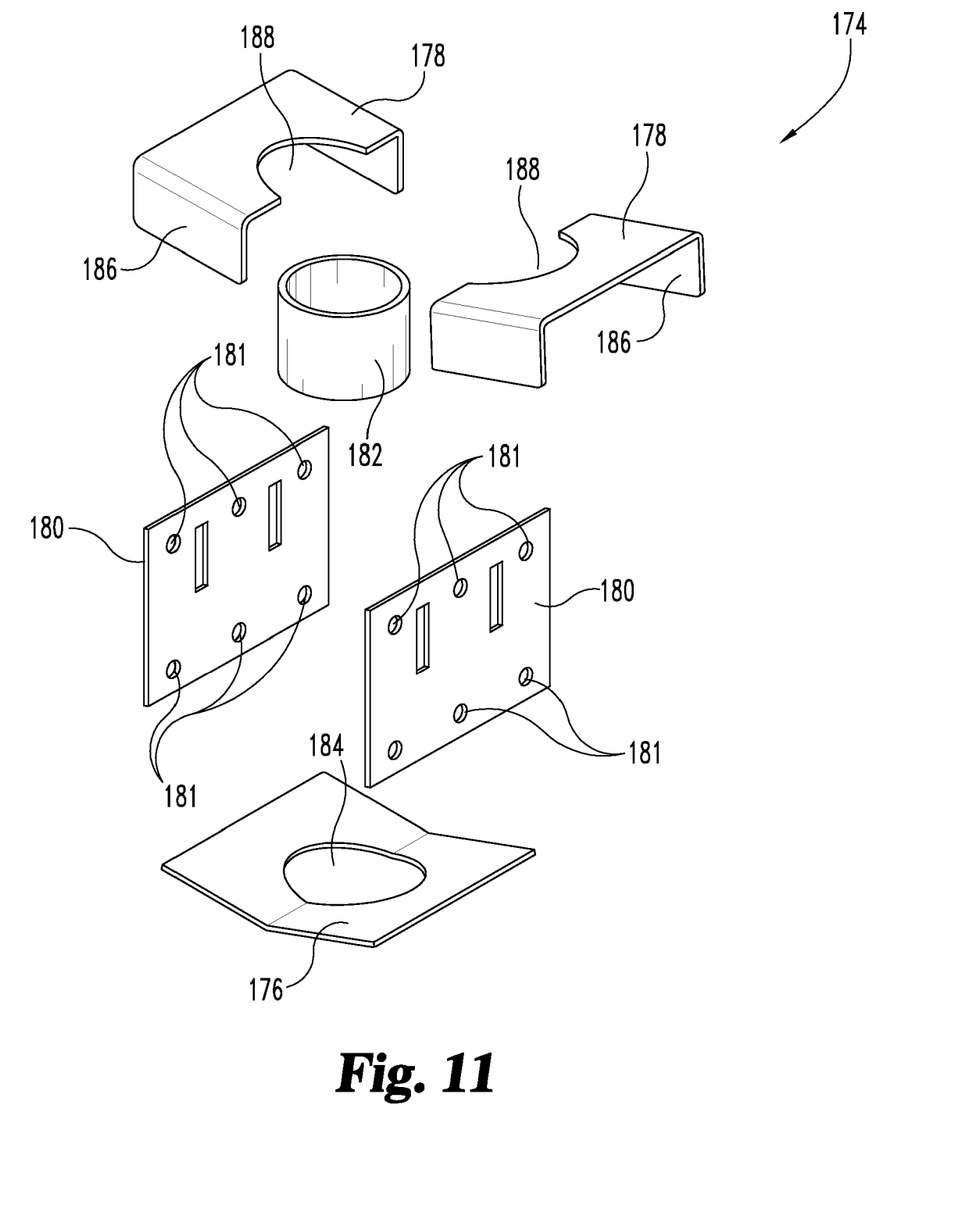
FIG. 11 is a perspective view of yet another alternative embodiment of the trailer mount.

For example, alternative embodiments of the trailer mount 16 are illustrated in FIGS. 10 and 11. In FIG. 10, the trailer mount 104 includes a base 128 having a bottom wall 130 and two upwardly projecting mounting flanges 132. The bottom wall 130 also includes a central aperture 134 and a reinforcing rib 136. The reinforcing rib 136 is arcuate in shape and extends concentrically around the central aperture 134 as a continuous or discontinuous structure. A hub 138 is aligned over the central aperture 134 and welded to the bottom wall 130. A reinforcing plate 140 includes two downwardly depending flanges 142, a central aperture 144 and a reinforcing rib 146. The reinforcing rib 146 is continuous or discontinuous and extends in an arcuate manner circumferentially around the aperture 144. The reinforcing plate 140 is welded to the base 128 with depending flanges 142 extending between the mounting flanges 132 and the base 128. The reinforcing plate 140 is also mounted to the top of a hub 138. When assembled, the lumen 148 of the hub 138 is aligned with the opening or aperture 134 and the base 128 and the opening or aperture 144 and the reinforcing plate 140. The apertures 150 and the mounting flanges 132 provide a connection point for securing the trailer mount 104 to a trailer by cooperating bolts and locknuts or other appropriate fasteners (not shown).

FIG. 11 illustrates a trailer mount 174 including a substantially v-shaped base 176, a substantially v-shaped reinforcement plate 178 provided in two sections, two upstanding and projecting mounting plates 180 and a hub 182. More specifically, the v-shaped base 176 includes an aperture 184 while the reinforcement plate 178, including reinforcing flanges 186, includes a central aperture 188. The trailer mount 174 is welded together with the hub 182 extending between the apertures 184, 188 and the reinforcing flanges 186 extending between the mounting plates 180. Apertures 181 in the mounting plates allow the trailer mount 174 to be bolted to a trailer. Both of the FIGS. 10 and 11 embodiments include a bearing ring 152, a mounting plate 154, fasteners 156 and a bearing ring 160 in order to complete the connection with the pivot shaft 222 and still allow free pivoting movement.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

What is claimed is:

1. An extension coupling for interconnecting a trailer to a tow hitch carried by a tow vehicle, said extension coupling comprising:

a pin box assembly including a first section, a second section and a pivot connecting said first section and said second section together;

a shock absorber connected between said first section and said second section;

an air spring connected between said first section and said second section;

a king pin carried on said second section, the pivot is positioned forward of the king pin when the king pin is engaged with the tow hitch; and a locking wedge carried on said second section.

2. The extension coupling of claim 1, including a pivot shaft carried on said first section.

3. The extension coupling of claim 2, including a trailer mount wherein said trailer mount is fixed to the trailer and said pin box assembly is connected to said trailer mount by said pivot shaft.

4. The extension coupling of claim 3, wherein said trailer mount includes a mounting plate having a reinforcing rib and at least two projecting mounting flanges.

5. The extension coupling of claim 4, wherein said mounting plate includes a hub that receives said pivot shaft and said reinforcing rib is arc shaped and extends concentrically around said hub.

6. The extension coupling of claim 3, wherein said shock absorber is provided between said air spring and said mount.

7. The extension coupling of claim 6, wherein said air spring is provided between said shock absorber and said pivot.

8. The extension coupling of claim 7, wherein said pivot is provided at a front end of said pin box assembly.

9. The extension coupling of claim 8, wherein said air spring and said shock absorber are provided between said pivot shaft and said king pin.

10. The extension coupling of claim 9, wherein said shock absorber and said air spring are both offset from said king pin and said pivot shaft.

11. The extension coupling of claim 10, wherein said air spring is a rubber air bladder.

12. The extension coupling of claim 3, wherein said trailer mount includes a v-shaped base and a hub that receives said pivot shaft.

13. The extension coupling of claim 12, wherein said trailer mount includes at least two mounting flanges projecting from said base.

14. The extension coupling of claim 1, further including a fastener securing said locking wedge to said second section.

15. The extension coupling of claim 1, wherein said second section includes a skid plate.

16. The extension coupling of claim 15, further including two fasteners securing said locking wedge to said skid plate.

17. The extension coupling of claim 16, wherein said locking wedge includes two elongated slots and said two fasteners are received in said two elongated slots.

18. The extension coupling of claim 17, wherein said king pin is received in and projects through said skid plate adjacent said locking wedge.

19. An extension coupling for connecting a trailer to a tow hitch carried by a tow vehicle, the extension coupling comprising:

a pin box assembly including a first section, a second section and a pivot connecting the first section to the second section;

a trailer mount pivotally connected to the pin box assembly;

a king pin pivotally connected to the second section, the king pin being selectively restrained from pivoting about the second section; and wherein the extension coupling has an installation position in which the trailer mount is connected to the trailer and the king pin is engaged with the tow hitch, the pivot is forward of the king pin, and the king pin is restrained from movement.

20. The extension coupling of claim 19, further comprising an air system mounted between the first section and the second section of the pin box assembly, the first section and the second section configured to cover the air system.

21. The extension coupling of claim 20, wherein the air system includes an air spring and a shock absorber, the air spring is mounted on the second section and the shock absorber is mounted between the first section and the second section.

22. The extension coupling of claim 19, further comprising a wedge positioned on the second section, the wedge configured to contact the king pin and to restrain the king pin from rotation.

23. The extension coupling of claim 22, further comprising a fastener; and wherein the wedge defines at least one slot, the fastener securing the wedge to the second section through the slot, the slot configured to allow the wedge to be selectively positioned on the second section.

24. An extension coupling for connecting a trailer to a tow hitch carried by a tow vehicle, the extension coupling comprising:

a pin box assembly including a first section, a second section and a pivot connecting the first section to the second section;

a trailer mount pivotally connected to the pin box assembly, the trailer mount configured to attach to the trailer;

a king pin pivotally connected with the second section, the pivot is positioned forward of the king pin when the king pin is engaged with the tow hitch;

means for dampening shock on the tow vehicle; and means for regulating a compression rate and an expansion rate of the pin box assembly.

25. The extension coupling of claim 24, wherein the means for dampening shock includes a shock absorber, the shock absorber is mounted between the first section and the second section.

26. The extension coupling of claim 24, wherein the means for regulating includes an air bag mounted to the second section.

27. The extension coupling of claim 24, wherein the first section and the second section define an enclosure, and the means for dampening shock and the means for regulating are positioned in the enclosure.

* * * * *